Patented July 30, 1946

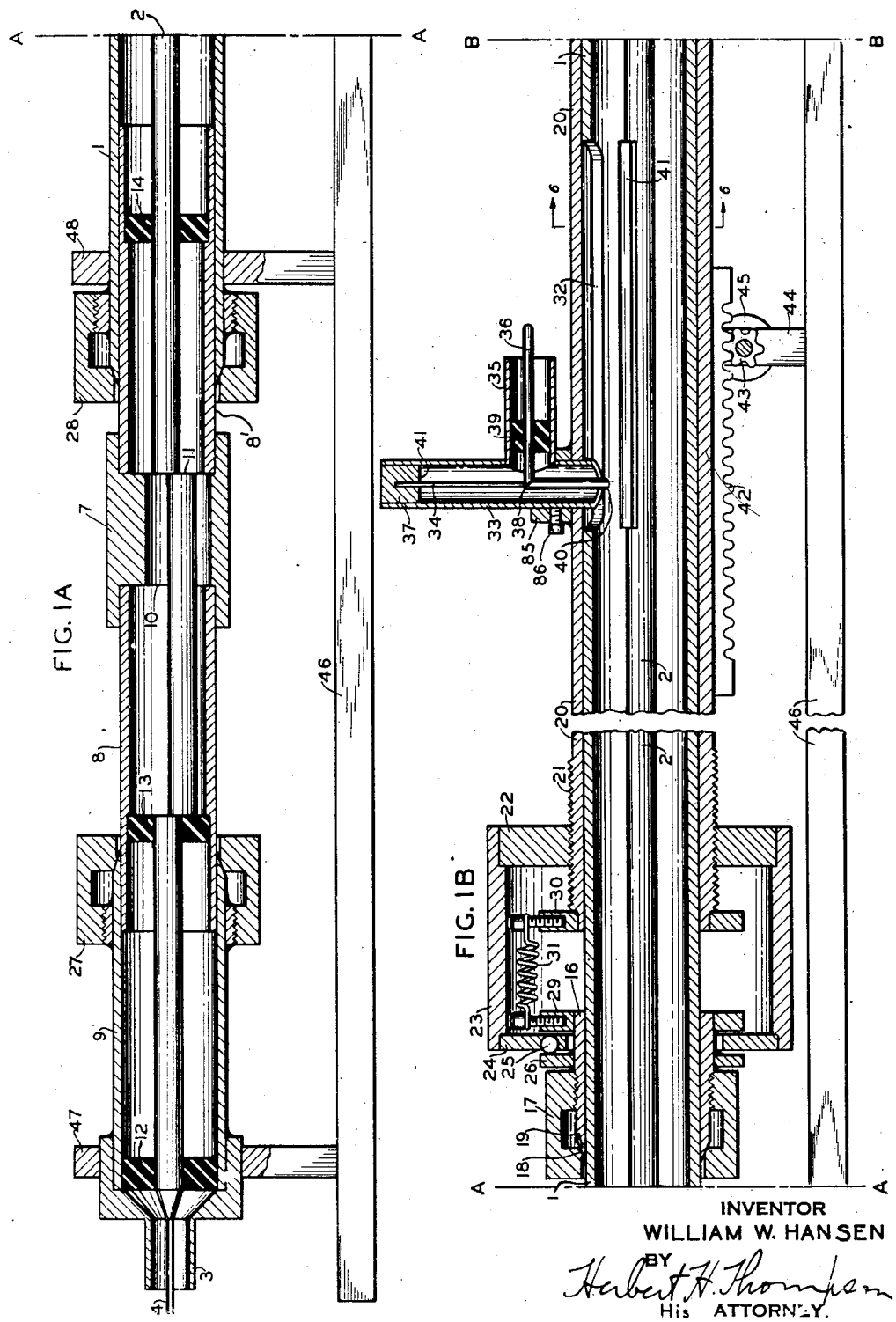

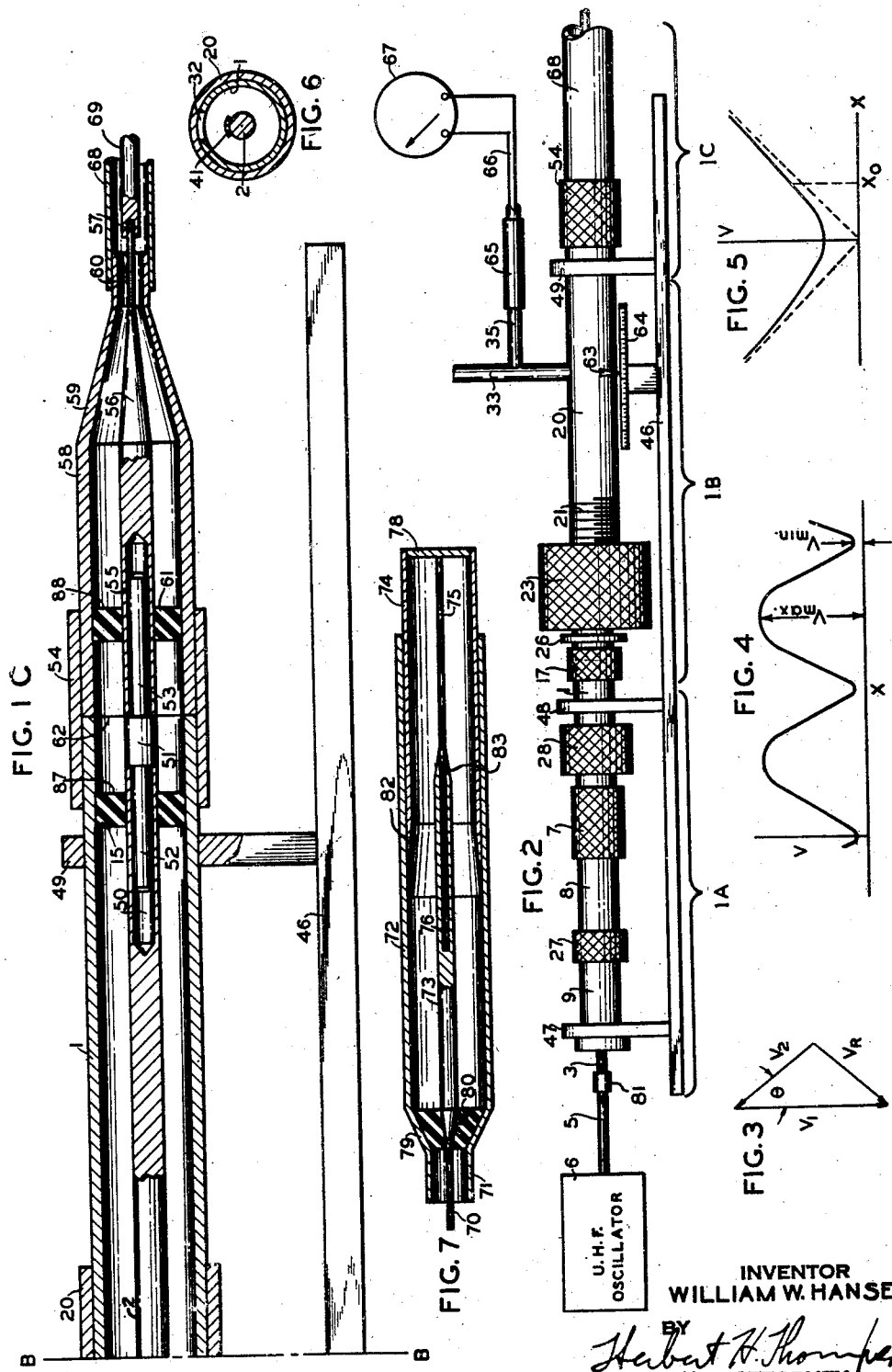

2,404,797

UNITED STATES PATENT OFFICE 2,404,797

CONCENTRIC LINE MEASURING DEVICE

William W. Hansen, Garden City, N. Y., assignor to Sperry Gyroscope Company, Inc., Brooklyn, N. Y., a corporation of New York Application December 12, 1941, Serial No. 422,716

14 Claims. (Cl. 171—95)

The present invention is related, generally, to the art including measuring devices for high frequency transmission lines.

Prior art methods of attenuation or loss measurement for transmission lines require large samples of test line and give poor accuracy for lines having small values of attenuation factor and/or power factor. Furthermore, such methods require measurements to be made and averaged over a band of frequencies to obtain any satisfactory accuracy. In addition, such measurements rapidly decrease in accuracy at ultra high frequencies.

The present invention provides an apparatus and methods for performing rapid and accurate loss and attenuation measurements on extremely short sections of transmission lines and on dielectric substances, at ultra high frequencies of the order of 3 centimeters to one meter in wave length. Means are provided for efficiently coupling the test line to the measuring apparatus and for overcoming the effects of reflections at possible discontinuities in the couplings.

Accordingly, it is an object of the present invention to provide improved apparatus and methods of testing high frequency transmission lines.

It is another object of the present invention to provide improved apparatus and methods for testing concentric transmission lines of low attenuation, at ultra high frequencies of the order of 3 to 100 centimeters in wave length.

It is a further object of the present invention to provide improved apparatus for exploring an ultra-high frequency standing wave pattern existing on a concentric transmission line without substantially altering the field pattern within the line or adding loss to or loading the line.

It is still another object of the present invention to provide improved apparatus and methods for accurately and rapidly determining losses in small samples of high quality low attenuation concentric transmission lines and in the dielectrics thereof at ultra high frequencies, substantially independent of reflection effects caused by connecting the test line to the measuring apparatus.

It is a still further object of the present invention to provide improved approximate methods for rapidly and accurately determining losses in transmission lines and dielectrics.

It is yet another object of the present invention to provide improved coupling devices for concentric transmission lines whereby wave reflections are minimized.

Other objects and advantages will become apparent from the attached specification, taken in connection with the accompanying drawings, wherein one embodiment of the invention is illustrated.

In the drawings,

Figs. 1A, 1B, and 1C, are longitudinal cross sectional views of cooperating portions of the system of Fig. 2.

Fig. 2 is an elevation view of the system of the invention, portions thereof being shown more in detail in Figs. 1A, 1B and 1C.

Fig. 3 is an explanatory vector diagram.

Fig. 4 is an explanatory graph.

Fig. 5 is an enlarged portion of Fig. 4.

Fig. 6 is a cross section taken along the line 6—6 of Fig. 1B.

Fig. 7 is a longitudinal cross sectional view of an auxiliary device.

Similar characters of reference are used in all of the above figures to indicate corresponding parts.

Referring first to Fig. 2, there is shown the complete system of the present invention. A suitable source 6 of ultra high frequency oscillations of a predetermined frequency, which may be in the range from 3 centimeters to one meter in wave length, is coupled to a section of line 68 under test, by means of an impedance transformer 1A, an exploring and measuring section 1B and a coupling 1C, the latter portions being shown more in detail in Figs. 1A, 1B and 1C, respectively.

Referring now to Fig. 1A, there is illustrated an impedance matching transformer of the type disclosed in copending application Serial No. 393,868 for High frequency tube structure, filed May 17, 1941 in the name of William W. Hansen and John R. Woodyard. It is understood that any other suitable type of impedance transformer may be used here. As has been more fully described in that application, this impedance transformer 1A is adapted to match an arbitrary concentric transmission line to one having a particular characteristic impedance. In the present instance, this impedance transformer 1A is used to match the output concentric line 5 of source 6 to the measuring line composed of concentric conductors 1 and 2 and the line 68 under test connected thereto by coupling 1C. Line 5 is connected to terminals 3, 4, of impedance transformer 1A by a coupling 81, which may be similar to coupling 54, shown in Fig. 1C and described below. The line 1, 2 is formed to have a particular characteristic impedance such as 72 ohms.

As has been more fully described in application

Serial No. 393,868, an impedance match is obtained by loosening clamping members 27, 28 and then longitudinally adjusting sliding portion 7, 8, 8', 13 and 14 of impedance transformer 1A (shown in its rightmost position in Fig. 1A) until the impedance looking toward the left from sleeve 7 is a pure resistance. The impedance looking toward the right from sleeve 7 is also adjusted or selected to have purely resistive impedance, which may be different in value from that looking leftward. These two resistive impedances are then matched by rotating sleeve 7 to the proper angular position, where the quarter wave line enclosed by sleeve 7 has an impedance equal to the geometric mean of the two resistive impedances to be matched. The function of the transformer 1A is thus to match source 6 to the portion of the device in which actual measurement is accomplished, which will now be described.

As seen in Figs. 1B and 1C, conductors 1 and 2 extend through the remainder of the measuring device. Insulators 12, 13, 14, and 15 provide support for and position conductor 1 concentrically in conductor 2. The entire device is supported from a base 46 by supporting posts 47, 48, 49.

Referring now particularly to Fig. 1B, conductor 1 has slidably mounted thereon a short sleeve 16 which carries, by means of threads thereon, a clamp 17. Rotation of clamp 17 relative to sleeve 16 causes a tapered portion 18 of clamp 17 to bear on tapered fingers 19 of sleeve 16, thereby clamping sleeve 16 at any desired longitudinal position on conductor 1. At a suitable distance from short sliding sleeve 16 is a long tube 20, also slidably mounted on conductor 1. Tube 20 has a threaded portion 21 at its end adjacent to sleeve 16 and carries on this threaded portion 21 a threaded flange 22. Mounted concentrically with conductors 1 and 2 on flange 22 is a tubular member 23 extending toward sleeve 16. This member 23 carries a bearing ring 24, in which are rotatably or fixedly mounted a plurality of hardened steel balls 25, which bear against a hardened bearing plate 26 fixed to sleeve 16. Sleeves 16 and 20 are urged together by means of one or more springs 31 whose ends are fastened to rings 29 and 30 fixed respectively to the adjacent ends of sleeves 16 and 20.

Member 23 is normally adjusted so that springs 31 are under tension. Then rotation of member 23 will serve to change slightly the separation of sleeves 16 and 20, with springs 31 serving to take up and eliminate any back lash in threads 21.

Also fixed to sleeve 20 is a suitable rack 42, engaged by a pinion 43 journaled in a support 44 fixed to base 46. In this way, upon loosening clamp 17, rotation of knob 45 connected to pinion 43 will serve to longitudinally position both sleeve 20 and sleeve 16 along conductor 1 in a coarse manner. Then, upon tightening clamp 17 and rotating member 23, a fine and accurate adjustment of sleeve 20 may be obtained, without backlash.

Outer tubular conductor 1 is provided with an elongated longitudinal slot 32 parallel to inner conductor 2. Extending through slot 32 and fixed to outer tube 20 by means of collar 85 and set screw 86 is a coaxial line device which serves as the terminal and exploring apparatus by means of which actual voltages appearing inside of conductor 1 may be measured. This device consists of an exploring electrode 40 forming the inner conductor of a concentric line section having outer conductor 33. This line section is formed to have a predetermined impedance, such as 72 ohms.

Connected to this line section 40, 33 as by a T-junction at 38 is a coupling concentric line section 36, 35 of the same impedance, to which, as will be described, may be coupled the detecting and indicating apparatus.

The portion of conductor 40 beyond junction 38 is made of small diameter such as at 34, so that the ratio of the outer diameter of 34 to the inner diameter of 33 is large. Furthermore, a shorting plug 37 is inserted at the end of line section 33, 34 at such a position that the stub line 33, 34 is exactly one-quarter of a wave length at the operating frequency of source 6, so that the line section 33, 34 will offer a very high impedance. Plug 37 may be made adjustable in a manner well known to the art, if the frequency range of source 6 is to be varied. The position of probe 40 relative to conductors 1 and 2 may be determined by means of a stationary scale 64 and an index fixed to sleeve 20, as shown in Fig. 2.

Adjacent to slot 32 and fastened to inner conductor 2 is a sector 41 of tubing positioned concentric with conductor 2, as shown in Figs. 1B and 6. The function of sector 41 is to compensate for the change in impedance due to the presence of slot 32, and thereby prevent mismatch and undesired wave reflections. The probe 40 is extended toward sector 41, thus acting as a capacitative probe for exploration of the region along the length of sector 41. Probe 40 is positioned as far away from sector 41 as possible, consistent with obtaining reasonable values of output to be measured, so as not to disturb appreciably the field pattern between conductors 1, 2.

Referring now to Fig. 1C, fixed outer tubular conductor 1 extends past the end of movable sleeve 20, and is supported near its end by leg 49, fixed to base 46. The concentric line elements 1, 2 are ended in such a manner that a concentric transmission line 68 in which losses are to be measured may be suitably joined thereto. As shown in the figure, inner conductor 2 is preferably terminated a suitable distance inside outer conductor 1, and the end of conductor 2 is bored or made hollow as at 50. If the line 68 to be measured has conductors of the same diameters as those of line 1, 2, direct coupling is made by forming the end of the inner conductor of line 68 in the same manner as conductor 2. The outer conductors are juxtaposed as at 62, and a connecting sleeve 54 is suitably fixed to both outer conductors, as by a squeeze or soldered jointing or by suitable threads, not shown. The inner conductors are joined by a connecting member 51, formed to have a central portion of diameter equal to the outer diameter of the inner conductors and of length equal to the separation between the inner conductors when the outer conductors are joined. The outside sections of connecting member 51 have a diameter equal to the bores of the inner conductors, and are squeezed into these bores. Thus, a smooth joint is formed relatively free from undesirable discontinuities and wave reflections.

If the two lines to be joined are of different sizes, the coupling device 58 of Fig. 1C may be used. Into the centrally placed hole 50 in the end of conductor 2 is inserted the member 51, which may be as just described, with a portion of diameter equal to the outer diameter of conductor 2 and two portions 52 and 53 of diameter equal to the hole in conductor 2. Over the outer conductor 1 may be placed concentric sleeve 54. The adapter then consists of an inner conductor 55 of outer diameter equal to that of member 51 and conductor 2, and made to slide over portion 53 of member 51, and a tapered portion 56 connected to conductor 55 and tapering to a portion 57 of diameter matching that of the bore of the inner conductor 69 of the line 68 to be measured. The outer conductor of the adapter consists of tubular member 58, having inner and outer diameters equal to that of tubular conductor 1, and having a tapered portion 60 tapering to diameters also matching those of the outer conductor of the line 68 to be examined. Conductors 57, 60 may then be connected to line 68 in the same manner as conductors 1, 2 were connected to 55, 58, or in any other suitable manner which will provide a smooth reflectionless joint.

Conductor 55 is positioned within conductor 58 by means of an insulator 61. Corresponding faces 87, 88 of insulators 15, 61 are spaced apart a distance electrically equal to one quarter wave length, including the effect of the dielectric material of the insulator thickness. Similar insulator arrangements may be used at the joint between adapter 58 and test line 68. Any other suitable type of joint may be here used.

Referring now to Fig. 2, there is shown, connected to concentric line coupling member 35, 36, a crystal detector 65, which is preferably of the "cat's whisker" type mounted in a plastic insulating material, provided with suitable distributed by-pass capacitance for by-passing the energy of the operating frequency and provided with suitable leads 66 for applying the detected current to a galvanometer 67 of proper range. As is well known, for low values of high frequency voltage, the reading of galvanometer 67 will be proportional to the square of the high frequency voltage input.

The method of using the apparatus will now be described. Two situations arise: (1) where the characteristic impedance of test line 68 is the same as that of conductors 1, 2; and (2) where these impedances differ.

Let it be assumed, first, that the characteristic impedance of the concentric transmission line 68 to be measured is the same as the section of line 1, 2 of the measuring device containing probe 40. In this case, there will be no discontinuity in impedance at the junction 62 between the two lines. For simplicity, let it also be assumed that the attenuation in the part of the line containing probe 40 is negligible, at least in comparison to that of line 68. This is a reasonable assumption, because of the relatively short length of line 1, 2 to the right of probe 40, and also because of the high quality with which line 1, 2 may be constructed, for measuring purposes.

Upon impressing a high frequency voltage from source 6 upon the system, a wave will run from left to right in the measuring device. If the length of the test line is L, the voltage of this wave will be attenuated by a factor $\epsilon^{-\alpha L}$ in travelling to the end of line 68, where $\alpha$ is the well-known symbol for attenuation constant of line 68, and is the quantity to be measured. With line 68 short-circuited at its far end, the wave is reflected at the end of line 68, and a return wave travels back toward probe 40. The total attenuation of the reflected wave will then be $\epsilon^{-2\alpha L}$. The waves running in the two opposite directions form a standing wave pattern along conductors 1, 2, and, as is well-known in the art, the ratio of voltages at minimum and maximum points in this pattern is given by:

$$R = \frac{V_{min}}{V_{max}} = \frac{1 - e^{-2\alpha L}}{1 + e^{-2\alpha L}} = \tanh \alpha L \qquad (1)$$

The variation of voltage along line 1, 2 is shown in Fig. 4.

Readings proportional to the values $V_{min}^2$ and $V_{max}^2$ may be obtained by observing readings of the galvanometer 67 as the probe 40 is moved along the measuring device by means of rack 42 and pinion 43 or by means of the screw 21 and nut 23, as described. In this way $R^2$ may be obtained directly, leading to the value of $\alpha$ by a simple calculation, L being known.

Several approximations may be used for restricted conditions. Thus, where $\alpha L$ is very small, $\tanh \alpha L$ nearly equals $\alpha L$, and there is obtained the approximate formula $$\alpha L \cong \frac{V_{min}}{V_{max}} \qquad (\alpha L)^2 \ll 1 \qquad (1a)$$

If $\alpha L$ is large, $$\frac{V_{min}}{V_{max}} = \frac{1 - \epsilon^{-2\alpha L}}{1 + \epsilon^{-2\alpha L}} \cong 1 - 2\epsilon^{-2\alpha L}$$

and $$-\alpha L \cong \frac{1}{2} \log_\epsilon \left[ \frac{1 - \frac{V_{min}}{V_{max}}}{2} \right] \qquad (1b)$$

The above method offers several practical difficulties. If $\alpha L$ is large, then $$\frac{V_{min}}{V_{max}}$$

is nearly unity, since the reflected wave is very highly attenuated. Hence, the quantity in parentheses in (1b) is hard to determine with sufficient accuracy.

If $\alpha L$ is very small, $$\frac{V_{min}}{V_{max}}$$

is very small, and it is difficult to obtain a suitable detector which will maintain a regular law, such as the square law, which it approximates closely for small values of input, over a widely varying range of inputs. As a practical matter, $\alpha L$ should lie in the range $.1 < \alpha L < 1$ for best results with the above method. This means that for high quality lines, where $\alpha$ may be of the order of $10^{-3}$ in.$^{-1}$, fairly long lengths of test line must be used.

Another method of using the device of the present invention may be understood by the following analysis.

Let $V_1$ represent, for a given position of probe 40, the magnitude of the forward (left to right) travelling wave, and furthermore, let $V_1$ be of unit length. This means that all vectors to be used are referred to $V_1$ as a base, and all magnitudes are relative to that of $V_1$. The reflected wave may be represented as a vector $V_2$ having magnitude $\epsilon^{-2\alpha L}$. If the probe 40 is at a position corresponding to a minimum of the curve of Fig. 4, then vector $V_2$ will be in line with and opposing vector $V_1$. At a maximum point of the curve of Fig. 4, $V_2$ will be in line with and additive to $V_1$. For some other position, $V_2$ will be at some phase $\theta$ with respect to $V_1$, as shown in Fig. 3. The resultant voltage indicated by the device will then be $V_R$.

As probe 40 moves along conductors 1, 2, it will be clear that $\theta$ will vary, and $V_R$ will seem to rotate about the terminus of vector $V_1$. Now, for small values of $\alpha L$, corresponding to short lengths of high quality and low attenuation line, the length $\epsilon^{-2\alpha L}$ of vector $V_2$ is approximately given by $$\epsilon^{-2\alpha L} = 1 - 2\alpha L \qquad (2)$$

By the usual cosine law of trigonometry, $$V_R = \sqrt{(1)^2 + (1-2\alpha L)^2 - 2(1-2\alpha L)(\cos\theta)} \qquad (3)$$

But, for small values of $\theta$, $$\cos\theta \cong 1 - \frac{\theta^2}{2} \qquad (4)$$

Hence, using these approximations, $$V_R \cong \sqrt{\theta^2 + (2\alpha L)^2} \qquad (5)$$

neglecting second order terms.

The angle $\theta$ may be related to the distance $x$ moved by probe 40, as follows:

$$\theta = \frac{4\pi x}{\lambda} \qquad (6)$$

where $\lambda$ is the operating wave length of source 6, and $x$ is measured from a minimum point, as shown in Fig. 4. In this way, Equation 5 becomes $$V_R = 2\sqrt{\left(\frac{2\pi x}{\lambda}\right)^2 + (\alpha L)^2} \qquad (7)$$

The shape of this curve near the minimum at $x=0$ is shown enlarged in Fig. 5. The width or sharpness of the minimum depends on $\alpha L$, and may be used to determine $\alpha L$ and thereby $\alpha$.

Thus at the minimum, where $x=0$, and $$V_R = V_{min}$$

$$V_{min}^2 = 4(\alpha L)^2 \qquad (8)$$

and this is the minimum indication on galvanometer 67. If $x_0$ is the value of $x$ for which the galvanometer reading is double its minimum value, then $$2V_{min}^2 = 4\left\{\left(\frac{2\pi x_0}{\lambda}\right)^2 + (\alpha L)^2\right\} = 8(\alpha L)^2 \qquad (9)$$

from Equation 8. Hence, from the above, it will be seen that the distance $x_0$ required to move the probe 40 from a minimum value of $V_R^2$ to a position giving twice the minimum value of $V_R^2$ is determined by:

$$\alpha L = \frac{2\pi x_0}{\lambda} \text{ for } \alpha L << 1 \qquad (10)$$

This method of measurement uses crystal currents over a small range, so that deviations from square law operation of the crystal are minimized. Furthermore, absolute calibrations of the galvanometer 67 are unnecessary. In this way, a practical and accurate method of measuring small attenuations is provided. The value $x_0$ may be taken as the measure of the width of the standing wave minimum.

The above method was derived on the basis of negligible reflections from the junction of the test line 68 to the measuring apparatus. If considerable mismatch exists, it may readily be seen that inaccurate results will be obtained. For example, with a very long line, whereby no reflected wave is obtained, $\alpha L$ should be measured as infinite. However, mismatch or impedance discontinuity at the joint will cause a portion of the outgoing wave to be reflected, yielding standing waves in the measuring device, which would then give inaccurate results.

This trouble can be handled in two ways: either by taking care to make the joint free from impedance discontinuities, or by allowing for the presence of waves reflected from the joint. Both methods may be used at once, a joining section 56, 59 already described being used to avoid such discontinuities as far as possible.

For reflection compensation, the far reflecting end of the test line 68 is now not short-circuited but is connected to a shorted line section of small but variable length, which may be constructed in the manner shown in Fig. 7.

The far end of line 68 is attached to conductors 70, 71, which expand, keeping the same diameter ratio, to conductors 72, 73, by means of tapered portions 79, 80. Slidably mounted inside tubular conductor 72 is a conducting tube 74, whose end is tapered as at 82 to provide a smooth transition between tubes 72 and 74. Inner conductor 73 has a central bore 76, which is slidably engaged by a conductor 75. Conductors 75 and 74 are rigidly fastened and electrically connected by a shorting disk 78. Conductor 73 is also provided with a smooth tapered transition section 83.

With the device of Fig. 7 attached to the reflecting end of the test line 68, variation of the length of the device will vary the phase of the wave reflected from disk 78 back into test line 68, and thus varies the phase of the reflected wave at probe 40 with respect to that of the forward wave.

If $Z_2$ is the characteristic impedance of line 68, then the impedance seen looking in the direction of line 68 from junction 62 will have a minimum value of $Z_2 \tanh \alpha L$ or a maximum $$\frac{Z_2}{\tanh \alpha L}$$

according as the phase of the reflected wave is in phase opposition or in aiding phase with respect to the forward wave.

If the impedance of the measuring line 1, 2 is denoted by $Z_1$, then the corresponding standing wave ratios will be $$\frac{Z_1}{Z_2 \tanh \alpha L} \text{ or } \frac{Z_1 \tanh \alpha L}{Z_2} \qquad (11)$$

or their reciprocals.

Four possible conditions arise, as follows:

1. $Z_1 < Z_2$ and $Z_1 < Z_2 \tanh(\alpha L)$

2. $Z_1 < Z_2$ and $Z_1 > Z_2 \tanh(\alpha L)$

3. $Z_1 > Z_2$ and $Z_1 > \frac{Z_2}{\tanh(\alpha L)}$

4. $Z_1 > Z_2$ and $Z_1 < \frac{Z_2}{\tanh(\alpha L)}$

In the first case, both the minimum and maximum impedance exhibited by the test line 68 are greater than that of the measuring line 1, 2, and the test line 68 accordingly exhibits open circuit properties to the measuring line. This means that the position of the voltage minima on measuring line 1, 2, as determined by probe 40, will not change as the effective length of the test line 68 is varied by moving the adjustable section 74, 75 of its termination. In this case the maximum and minimum standing wave ratios are as in (11).

In the second case, the impedance of measuring line 1, 2 lies between the minimum and maximum impedances of test line 68. Accordingly, test line 68 will exhibit short-circuit properties for some values and open-circuit properties for other values. Therefore, the position of the voltage minimum will jump by a quarter wave length as the line 68 is varied from minimum to maximum impedance. The minimum and maximum standing wave ratios are now given by $$\frac{Z_2 \tanh(\alpha L)}{Z_1} \text{ and } \frac{Z_1 \tanh(\alpha L)}{Z_2} \quad (12)$$

In the third case, the impedance $Z_1$ of the measuring line 1, 2 is greater than the maximum impedance of line 68, so that line 68 exhibits a short-circuited property and the minima remains fixed. The standing wave ratios are here $$\frac{Z_2}{Z_1 \tanh(\alpha L)} \text{ and } \frac{Z_2 \tanh(\alpha L)}{Z_1} \quad (13)$$

Finally, in the fourth case, again $Z_1$ lies between the limits of the impedance of line 68, which therefore may exhibit both short-circuit and open-circuit properties, causing the minima to change as the length of the shorting section of Fig. 7 is varied. The standing wave ratios are here $$\frac{Z_1 \tanh(\alpha L)}{Z_2} \text{ and } \frac{Z_2 \tanh(\alpha L)}{Z_1} \quad (14)$$

If the minimum standing wave ratio is denoted by $R_1$ and the maximum by $R_2$, then it will be clear that, if the position of $R_1$ is the same as $R_2$, (cases 1 and 3)

$$\tanh(\alpha L) \sqrt{\frac{R_1}{R_2}} \quad (15)$$

If $R_1$ and $R_2$ are at different positions (cases 2 and 4)

$$\tanh(\alpha L) = \sqrt{R_1 R_2} \quad (16)$$

Accordingly, the above analysis gives the following test procedure: measure the standing wave ratio for varying settings of the short-circuit section of Fig. 7. If the test line is perfectly matched to the measuring device, the ratio will be independent of the variable line length, and the attenuation may be determined from (1) or (10).

If the standing wave ratio does depend on line length, the minimum and maximum ratios are determined and the attenuation may be derived from (15) or (16), whichever is applicable.

The $x_0$ method derived above also holds for the mis-matched case. Here $$\tanh(\alpha L) = \sqrt{\frac{x_{01}}{x_{02}}} \quad (17)$$

if the minima are stationary, and $$\tanh(\alpha L) = \frac{2\pi}{\lambda}\sqrt{x_{01} x_{02}} \quad (18)$$

if they move.

The methods described above are not restricted to the measurement of attenuation of concentric transmission lines. The present invention is equally adapted for measuring power loss or power factor of dielectric materials, as by making a fixed type of line and inserting various dielectric materials or beads.

Furthermore, the present invention may be used with open transmission lines, by providing suitable adapting connectors between the test line and the measuring device.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. In a method of determining attenuation and like loss factor characteristics of a transmission line, the steps of coupling said line with a source of electrical energy of known wavelength so as to produce standing waves along said line, measuring the wave amplitude in the vicinity of the standing wave minimum for determining the width of the standing wave minimum wherein said wave amplitude changes by a predetermined function, said width of the standing wave minimum being a definite function of the attenuation characteristics of said line, and utilizing said width for determining the attenuation per unit length of said transmission line.

2. The method of measuring transmission line attenuation and like loss factor characteristics comprising the steps of projecting a forward wave along said line, reflecting said wave from the far end of said line, whereby a standing wave pattern is set up at the sending end of said line, varying the phase of said reflected wave to obtain predetermined relation with respect to said forward wave, and measuring the maximum and minimum standing wave ratios at said sending end, said characteristics being determined independently of reflections at the sending end of said line as a function of said ratios.

3. Apparatus for exploring the voltage along a concentric line having an axial opening in the outer conductor thereof, comprising a probe, means for moving said probe along said opening, means for preventing energy leakage through said opening, and means connected to the inner conductor of said line for compensating for the change in impedance of said line due to said opening.

4. Apparatus as in claim 3 wherein said last-named means comprises an axially extending sector of a cylindrical tube superposed on the inner conductor of said line opposite said opening.

5. Apparatus for exploring the voltage along a concentric line having an axial opening in the outer conductor thereof, comprising a probe, a sleeve enclosing said outer conductor, means for mounting said probe in said sleeve to project through said opening, means for moving said sleeve relative to said line whereby said probe is moved along said line, and means connected to the inner conductor of said line for compensating for the change in impedance of said line due to said opening.

6. Apparatus for exploring the voltage along a concentric line having an axial opening in the outer conductor thereof, comprising a probe, a sleeve enclosing said outer conductor, means for mounting said probe in said sleeve to project through said opening to be capacitively coupled to the inner conductor of said line, means for moving said sleeve relative to said line whereby said probe explores different sections of said line, means for indicating the voltage picked up by said probe, and means connected to the inner conductor of said line for compensating for the change in impedance of said line due to said opening.

7. Apparatus for exploring the voltage along a concentric line having an axially extending opening in the outer conductor thereof, comprising a probe, a sleeve enclosing said outer conductor, means for mounting said probe in said sleeve to project through said opening to be capacitively coupled to the inner conductor of said line, means for moving said sleeve relative to said line, whereby said probe explores different sections of said line, said sleeve moving means comprising coarse moving means including a rack fixed to said sleeve and cooperating with a fixedly pivoted pinion, and fine moving means including a coaxial threaded member cooperating with a fixed bearing plate and engaging a coaxial threaded portion of said sleeve; and means for indicating the voltage picked up by said probe.

8. Concentric line apparatus comprising a concentric transmission line having an axially extending opening in the outer conductor thereof, an electrically conductive sleeve surrounding said line and opening and having an inner radius substantially equal to the outer radius of said line, and means connected to the inner conductor of said line opposite said opening and extending substantially the length thereof for compensating for the change in impedance of said line due to said opening.

9. Concentric line apparatus comprising a section of concentric transmission line having an opening in the outer conductor thereof, and means connected to the inner conductor of said line for compensating for the change in impedance of said line due to said opening, wherein said last-named means comprises an axially extending conductive member connected to said inner conductor opposite said opening.

10. Concentric line apparatus comprising a section of concentric transmission line, a slidable sleeve surrounding the outer conductor of said line, and means for moving said sleeve relative to said line, said last-named means comprising coarse moving means including a rack fixed to said sleeve and cooperating with a fixedly pivoted pinion, and fine moving means comprising a coaxial threaded member cooperating with a bearing plate and engaging a coaxial threaded portion of said sleeve.

11. Electrical apparatus comprising a section of coaxial line having an inner conductor and a coaxial outer conductor, a slidable threaded sleeve surrounding the outer conductor of said line, coarse adjustment means including a rack fixed to said sleeve and a pinion fixedly pivoted with respect to said line section for cooperation with said rack whereby said sleeve may be moved along said line section by rotation of said pinion, and fine adjustment means including a bearing plate member movable axially along said line section, means for anchoring said member to said line section, and means cooperating with said member and having threads engaging said threaded sleeve whereby fine movement of said sleeve may be effected by anchoring said member to said line section and rotating said threaded means.

12. In a method of measuring attenuation and like loss factor characteristics of a transmission line, the steps of coupling said line with a source of electrical energy of known wavelength so as to produce standing waves along said line, measuring the wave amplitude at the position of the standing wave minimum, and measuring the distance from said position to the nearest point at which the square of the wave amplitude is double the square of the amplitude at said position, said distance being a definite function of the desired characteristics of said line.

13. Coaxial line apparatus comprising a section of coaxial transmission line having an opening in the outer conductor thereof, and means connected to the inner conductor of said line for compensating for the change in impedance of said line due to said opening, said last named means comprising a body attached to said inner conductor opposite said opening and extending axially therealong by an extent substantially equal to the axial extent of said opening.

14. A method of measuring attenuation and like loss factor characteristics of a transmission line sample, comprising the steps of conducting radio frequency energy of known wavelength to said line sample through a low-loss energy conductor, measuring the wave amplitude in the vicinity of a standing wave minimum in said conductor for determining the width of the standing wave minimum wherein said wave amplitude changes by a predetermined function, and utilizing said width for determining the attenuation per unit length of said transmission line sample.

WILLIAM W. HANSEN.